United States Patent
Zhao et al.

(10) Patent No.: US 9,800,303 B2
(45) Date of Patent: Oct. 24, 2017

(54) SYSTEM AND METHOD FOR INTELLIGENT RI/PMI SELECTION

(71) Applicant: Futurewei Technologies, Inc., Plano, TX (US)

(72) Inventors: Renjian Zhao, Acton, MA (US);
Zhengxiang Ma, Summit, NJ (US);
Leonard Piazzi, Denville, NJ (US);
Jian Wang, Shanghai (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 51 days.

(21) Appl. No.: 14/685,077

(22) Filed: Apr. 13, 2015

(65) Prior Publication Data
US 2015/0295626 A1  Oct. 15, 2015

Related U.S. Application Data (60) Provisional application No. 61/979,362, filed on Apr. 14, 2014.

(51) Int. Cl.
*H04L 1/00* (2006.01)
*H04B 7/0417* (2017.01)
(Continued)

(52) U.S. Cl.
CPC .......... *H04B 7/0417* (2013.01); *H04B 7/063* (2013.01); *H04B 7/0639* (2013.01); *H04J 11/0056* (2013.01); *H04L 5/0023* (2013.01)

(58) Field of Classification Search
CPC .... H04B 7/2121; H04B 7/2123; H04B 7/024;
H04B 7/0413; H04B 7/0452; H04B 7/0495; H04J 2203/0069; H04Q 2213/394; H04W 72/04; H04W 72/12; H04W 76/00; H04W 16/28; H04L 1/0048; H04L 1/06
(Continued)

(56) References Cited

U.S. PATENT DOCUMENTS

2012/0320774 A1  12/2012 Dai et al.
2013/0064276 A1*  3/2013 Kim ..................... H04B 7/063
375/219
(Continued)

FOREIGN PATENT DOCUMENTS

CN  101789849 A  7/2010
CN  102013953 A  4/2011
(Continued)

*Primary Examiner* — Dady Chery
(74) *Attorney, Agent, or Firm* — Vierra Magen Marcus LLP (57) ABSTRACT

An apparatus in a user equipment node (UE) is configured to perform a method for channel feedback. The method includes determining, based on a common reference signal received from a base station and one or more channel conditions, a plurality of values for a receiver table. The method also includes determining a plurality of values for a decision table based on corresponding values in the receiver table and a predetermined interference table. The method further includes selecting a value from the decision table. In addition, the method includes transmitting, to the base station, at least one of a rank indicator (RI) value and a precoding matrix indicator (PMI) value associated with the selected value in the decision table.

20 Claims, 8 Drawing Sheets

(51) Int. Cl.
*H04J 11/00* (2006.01)
*H04B 7/06* (2006.01)
*H04L 5/00* (2006.01)

(58) Field of Classification Search
USPC .......................................... 370/329, 334, 341
See application file for complete search history.

(56) References Cited

U.S. PATENT DOCUMENTS

2013/0243108 A1  9/2013  Chen et al.
2013/0322278 A1* 12/2013  Lee ..................... H04B 7/063
                                                       370/252

FOREIGN PATENT DOCUMENTS

CN         102223723 A       10/2011
CN         102859894 A        1/2013

* cited by examiner

SYSTEM AND METHOD FOR INTELLIGENT RI/PMI SELECTION

CROSS-REFERENCE TO RELATED APPLICATION(S) AND CLAIM OF PRIORITY

This application claims priority under 35 U.S.C. §119(e) to U.S. Provisional Patent Application No. 61/979,362, filed Apr. 14, 2014, entitled "INTELLIGENT RI/PMI SELECTION", which is hereby incorporated by reference into this application as if fully set forth herein.

TECHNICAL FIELD

The present disclosure relates generally to channel feedback in wireless communication systems, and more particularly, to a system and method for intelligent rank indicator (RI) and precoding matrix indicator (PMI) selection.

BACKGROUND

In long term evolution (LTE) downlink multiple-input multiple-output (MIMO) transmission modes, each user equipment node (UE) feeds back the "best" rank indicator (RI), precoding matrix indicator (PMI), or both to a base station (BS), where "best" is determined according to the UE's criterion of maximizing its own throughput. However, "maximizing its own throughput" at every UE is not equivalent to "maximizing overall system throughput", because different RI or PMI feedback can result in different interferences to other UEs in the network. This is particularly true when MIMO vertical tilting is used, because beams that are tilted down at a larger angle generally cause less interference to other UEs. Beam coordination between cells can be employed to help maximize overall system throughput. However, conventional systems do not consider beam coordination between cells. Dynamic "beam coordination" among nearby UEs requires complicated algorithms and real-time message exchanges among BSs, and increases overhead and system complexity.

SUMMARY

According to one embodiment, there is provided a method for channel feedback at a user equipment node (UE). The method includes determining, based on a common reference signal received from a base station and one or more channel conditions, a plurality of values for a receiver table; determining a plurality of values for a decision table based on corresponding values in the receiver table and a predetermined interference table; selecting a value from the decision table; and transmitting, to the base station, at least one of a rank indicator (RI) value and a precoding matrix indicator (PMI) value associated with the selected value in the decision table.

According to another embodiment, there is provided an apparatus for use in a UE and configured for channel feedback. The apparatus includes at least one memory and at least one processor coupled to the at least one memory. The at least one processor is configured to determine, based on a common reference signal received from a base station and one or more channel conditions, a plurality of values for a receiver table; determine a plurality of values for a decision table based on corresponding values in the receiver table and a predetermined interference table; select a value from the decision table; and control the UE to transmit, to the base station, at least one of a RI value and a PMI value associated with the selected value in the decision table.

According to yet another embodiment, there is provided a non-transitory computer readable medium embodying a computer program for use in a UE. The computer program includes computer readable program code for determining, based on a common reference signal received from a base station and one or more channel conditions, a plurality of values for a receiver table; determining a plurality of values for a decision table based on corresponding values in the receiver table and a predetermined interference table; selecting a value from the decision table; and transmitting, to the base station, at least one of a RI value and a PMI value associated with the selected value in the decision table.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of this disclosure provide methods for a user equipment (UE) to determine which rank indicator (RI), pre-coding matrix indicator (PMI), or RI/PMI pair to feed back to a base station (BS). In making the determination, the UE not only considers the benefits to its own reception and transmission capabilities (i.e., individual optimization), but the UE also considers minimizing the interferences that may be caused at other UEs as a result of transmission from the BS to the UE (i.e., system optimization). In making the determination, the UE utilizes an interference mutual information (MI) table that includes values associated with a plurality of different RI/PMI pairs. Each value represents an estimation of interference to the system based on the associated RI/PMI pair. The values of the interference MI table can be obtained ahead of time and can be approximated artificially.

Each RI/PMI pair is also associated with a predetermined transmit beam for the purpose of beam coordination. In beam coordination, multiple UEs feed back RI/PMI information to their serving BS. In some examples of beam coordination, a central controller receives the RI/PMI information from multiple BSs, determines transmit beams for each BS, and then sends instructions to the BSs to use the determined beams.

Conventional beam coordination techniques among nearby UEs typically require complicated algorithms, and more importantly, require real-time message exchange among BSs, which increases overhead and system complexity. Embodiments of the present disclosure provide beam coordination that is approximated statistically, without requiring real-time message exchanging and associated communication overhead. No real-time message exchange among BSs is needed. By employing the disclosed beam coordination techniques, embodiments of this disclosure advantageously increase total system capacity, particularly for systems employing MIMO vertical tilt. Notwithstanding the foregoing, the invention is also applicable in instances where real-time message exchange is used or desired.

Figure 1:
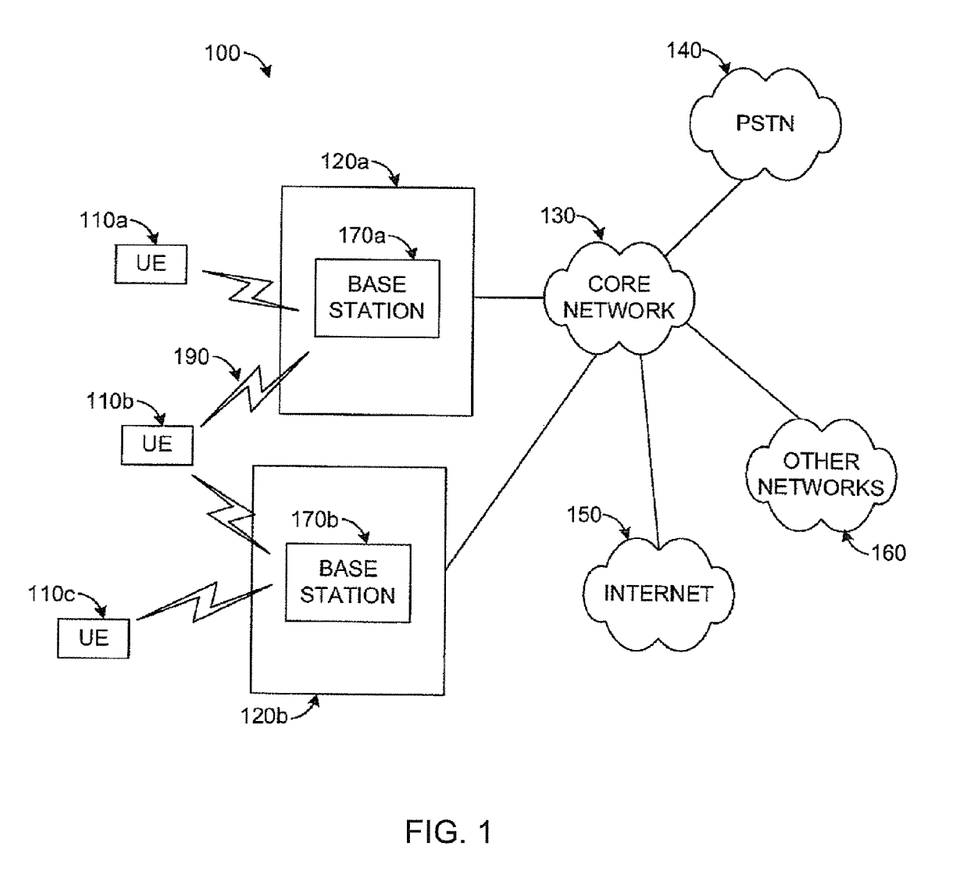
FIG. 1 illustrates an example communication system that that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment nodes (UEs) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell. In some of these embodiments, MIMO vertical tilting may be employed, as described in greater detail below.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement various wireless standards including LTE and/or LTE-A. Additionally, in accordance with this disclosure, one or more of the base stations 170a-170b and UEs 110a-110c are configured to communicate according to three-dimensional (3D) MIMO standards and principles. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
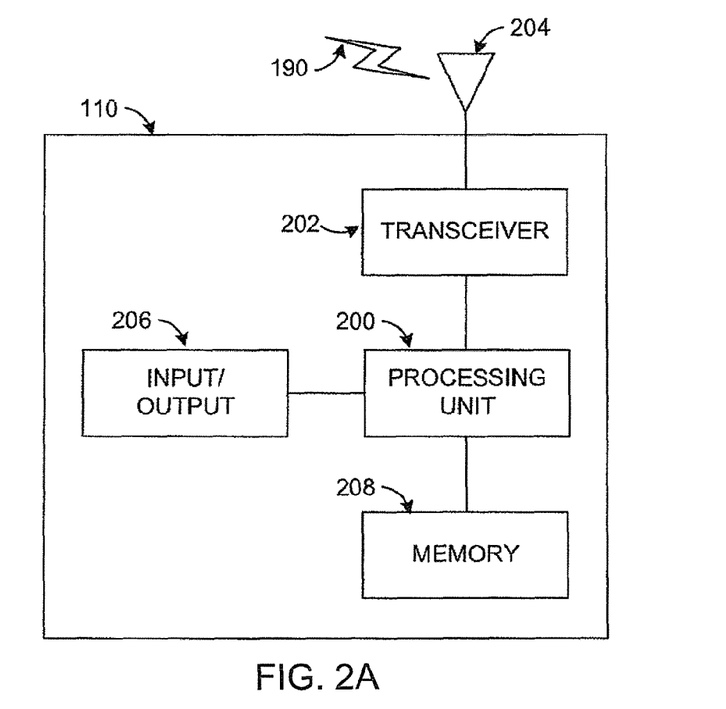
FIGS. 2A and 2B illustrate example devices that may be used for implementing the methods and teachings disclosed herein.
Figure 2B:
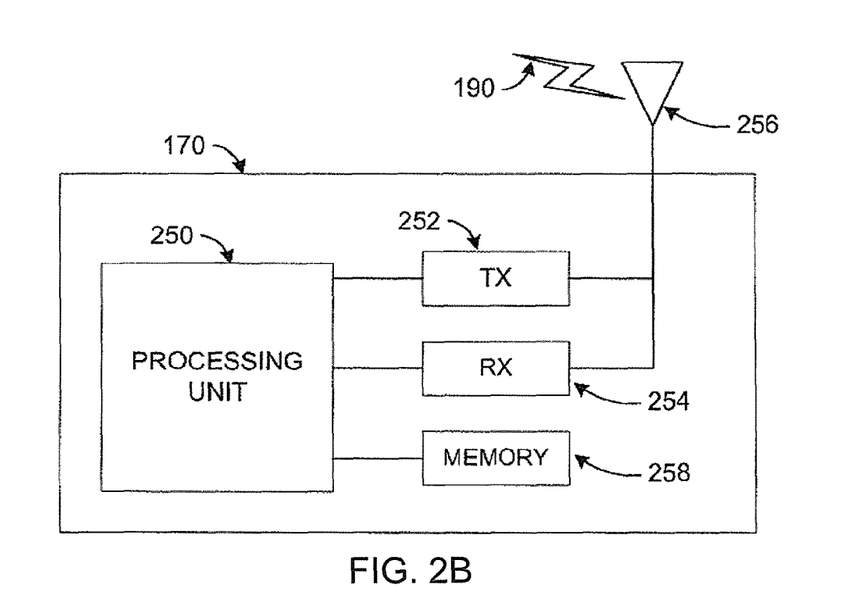

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the MIMO standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to, or receiving information from, a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the MIMO standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256, different from those coupled to the transmitter(s) 252, could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Figure 3:
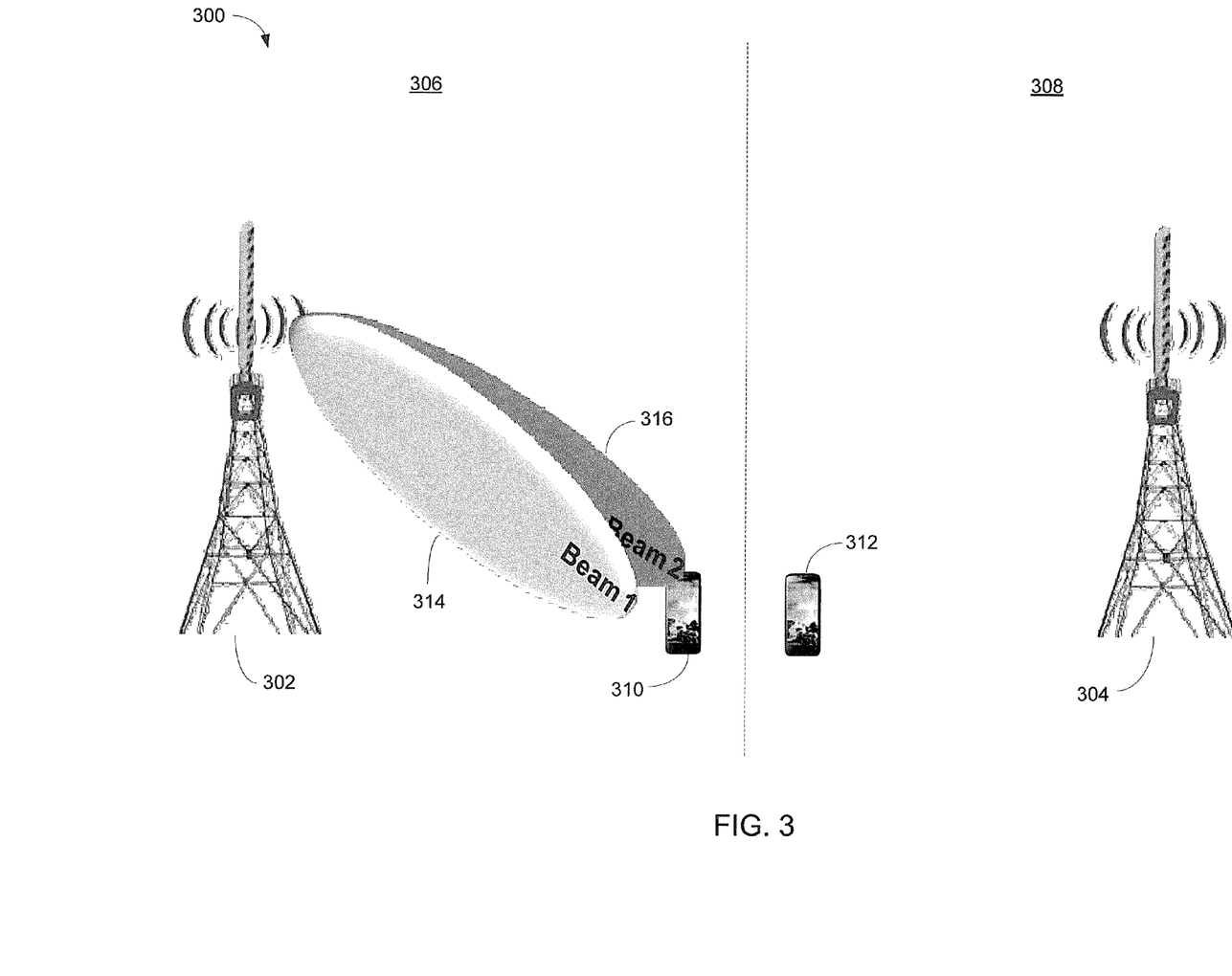
FIG. 3 illustrates portions of an example communication system in which MIMO vertical tilting is employed according to this disclosure.

FIG. 3 illustrates portions of an example communication system 300 in which MIMO vertical tilting is employed according to this disclosure. The portion of the system 300 shown in FIG. 3 includes a BS 302 that transmits in a coverage area 306, and a BS 304 that transmits in a coverage area 308. The system 300 also includes a plurality of UEs, including the UE 310 and the UE 312. Based on their locations in the system 300, the UE 310 is capable of communicating with the BS 302, while the UE 312 is capable of communicating with the BS 304. Various components of the system 300 may represent (or be represented by) components of the system 100 of FIG. 1. For example, the BSs 302-304 may represent the BSs 170a-170b, and the UEs 310-312 may represent the UEs 110a-110c.

As shown in FIG. 3, the BS 302 is capable of communicating using MIMO vertical tilting. In particular, the BS 302 may form a plurality of beams for communication, including beams 314-316. As opposed to simple two-dimensional, or planar, beams, the beams 314-316 may include a vertical tilt component. That is, each beam 314-316 can be directed at a downward angle. In the example shown in FIG. 3, the angle of the beam 314 is greater than the angle of the beam 316; thus, the coverage area of the beam 314 does not extend as far away from the BS 302 as the coverage area of the beam 316. Thus, the interference to other UEs (e.g., the UE 312) caused by transmissions from the BS 302 over the beam 314 is likely to be less than the interference to the other UEs caused by transmissions over the beam 316, which extends further away from the BS 302.

If the communication system 300 were a conventional MIMO system, the receiving UE 310 would consider only individual optimization (i.e., the benefits to its own reception and transmission capabilities) in determining RI and PMI values to feed back to the BS 302. Interference to nearby UEs (e.g., the UE 312) would not be considered by the UE 310 in determining RI and PMI values to feed back to the BS 302. However, in accordance with embodiments of this disclosure, the UE 310 considers not only individual optimization, but also considers interference to others (i.e. system optimization) in determining RI and PMI feedback. That is, when the UE 310 determines which RI/PMI pair to feed back to the BS 302, the UE 310 considers not only its own best throughput, but also takes into consideration potential interference to the UE 312 and any other nearby UEs that could possibly be affected by data transmissions from the BS 302 to the UE 310.

Figure 4:
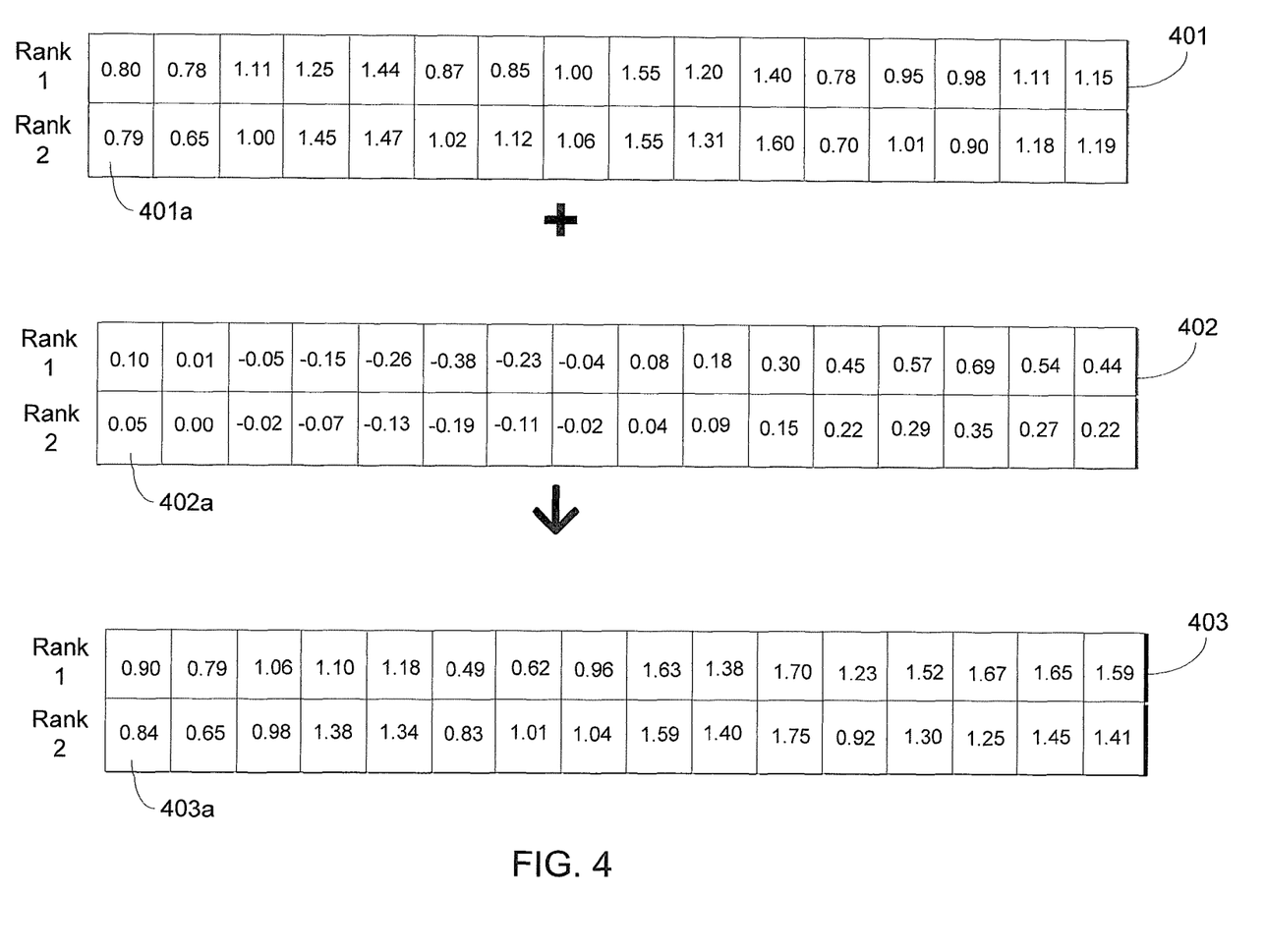
FIG. 4 illustrates examples of a plurality of interference tables that can be used by a receiver to intelligently select RI and PMI for feedback to a base station, according to this disclosure.

FIG. 4 illustrates examples of a plurality of interference tables that can be used by a receiver, such as the UE 310, to intelligently select RI and PMI for feedback to a BS, according to this disclosure. The tables include a receiver mutual information (MI) table (or simply "receiver table") 401, an interference MI table (or simply "interference table") 402, and a decision table 403. The tables 401-403 will be described in conjunction with the system 300. However, the tables 401-403 can be used in connection with other systems and devices.

As shown in FIG. 4, each table 401-403 has two rows and sixteen columns for a 4T2R (four transmit/two receive) MIMO system. Each row corresponds to a rank value (e.g., Rank 1 or Rank 2), and each column corresponds to a PMI value. Depending on the system 300, the number of rows and columns for the tables 401-403 could be different than 16×2. For example, for a MIMO receiver with four receive antennas (rank=4), each table 401-403 could be 16×4 (i.e., 4 rows). The values in each table 401-403 have units of bits/second/Hz (bps/Hz).

The receiver table 401 represents "individual throughput" for the UE 310. Each value in the receiver table 401 is determined at the UE 310 in real-time based on one or more calculations at the UE 310 for a particular RI/PMI combination and the current channel conditions, as known in the art. For a common reference signal or pilot signal received from the BS 302 on a receive channel, the UE considers every combination of RI and PMI, and determines a value for the receiver table 401. The values in the receiver table 401 may be determined based on the type of receiver. For example, the UE 310 may be a minimum mean square error (MMSE) receiver, an interference cancellation receiver, or the like. The type of receiver can have an effect on the calculations and the determined values. Once determined, the values of the receiver table 401 can be stored in a memory at the UE 310.

The interference table 402 is an interference MI table that represents the statistically determined interferences to other UEs (e.g., the UE 312) in the system 300, which the UE 310 considers in selecting a RI/PMI pair for feedback. The values of the interference table 402 can be determined in advance and can be approximated artificially, as described in greater detail below. The values in the interference table 402 serve as a weighting factor that causes the UE 310 to take system interference into consideration when determining a RI/PMI pair, rather than the UE 310 considering only optimization of its own individual throughput.

The decision table 403 represents a combination of the receiver table 401 and the interference table 402. That is, values in the decision table 403 are determined based on a combination of the individual throughput of the UE 310, as stored in the receiver table 401, and the statistically determined interferences to other UEs in the system 300, as stored in the interference table 402. In some embodiments, each value in the decision table 403 is determined by arithmetically summing corresponding values in the receiver table 401 and the interference table 402. For example, if value 403a represents a value in the decision table 403, and values 401a and 402a represent corresponding values in the receiver table 401 and the interference table 402, then value 401a+value 402a=value 403a. In other embodiments, each value in the decision table 403 can be determined by applying a mathematical function or set of masking rules to the corresponding values in the receiver table 401 and the interference table 402. For example, value 403a=f(value 401a, value 402a), where f(x, y) is a mathematical function or set of masking rules.

Once the values of the decision table 403 are determined after receiving a common reference signal, the UE 310 selects the RI and PMI values associated with the largest value in the decision table 403, in order to maximize its own benefit and minimize the negative impact of interference to others. That is, the UE 310 may select the largest value in the decision table 403, and then find the RI and PMI associated with that value. For example, if the value 403a is the largest value in the decision table 403, then the UE 110 determines that PMI=0 and RI=2 are associated with the value 403a. The UE 310 then can feed back PMI=0 and RI=2 to the BS 302.

Once the UE 310 feeds back the RI/PMI to the BS 302, the BS 302 receives the RI/PMI and uses the RI/PMI to select a transmit beam for transmitting data to the UE. In some embodiments, each PMI value can be associated with a particular transmit beam. For example, PMI=0 can be associated with the transmit beam 314, PMI=1 can be associated with the transmit beam 316, and PMI=x (2≤x≤15) can be associated with other transmit beams.

In some embodiments, the BS 302 just selects the transmit beam already represented by the RI/PMI pair. For example, if UE 310 feeds back PMI=0 and RI=2 to the BS 302, and the combination of PMI=0 and RI=2 is associated with the transmit beam 314, the BS 302 transmits data to the UE 310 on the transmit beam 314. In some embodiments, the BS 302 can override the default selection and select an alternative transmit beam. The selected transmit beam can be selected from multiple possible transmit beams that can include different vertical tilts. Because different UEs may feed back different RI/PMI to the BS, the BS may use different transmit beams for transmitting data to different UEs. In some embodiments, the RI/PMI information fed back from multiple UEs to multiple BSs is sent to a central network controller that controls the BSs. The central network controller then selects data transmit beams for each BS and each UE receiver.

In some embodiments, edge user protection can be employed. In embodiments with edge user protection, when the UE 310 is near the edge of the coverage area 306, the UE 310 may not consider the interference table 402 so as to not sacrifice its own reception to benefit other UEs. In such embodiments, the receiver table 401 and the decision table 403 can have the same values. (Herein, "edge user" is defined as a user with lower throughput, e.g., a user with throughput at 5% of the average throughput of all users. Thus, "edge user" may not necessarily be at the physical boundary of the cell coverage, due to various channel fading conditions).

Each of the tables 401-403 can be stored in a memory at the UE 310. While the tables 401-403 are described herein as data tables, this is merely one example data structure. In some embodiments, the tables 401-403 can be implemented as any other suitable data structure, including a data list, data file, and the like.

Figure 5:
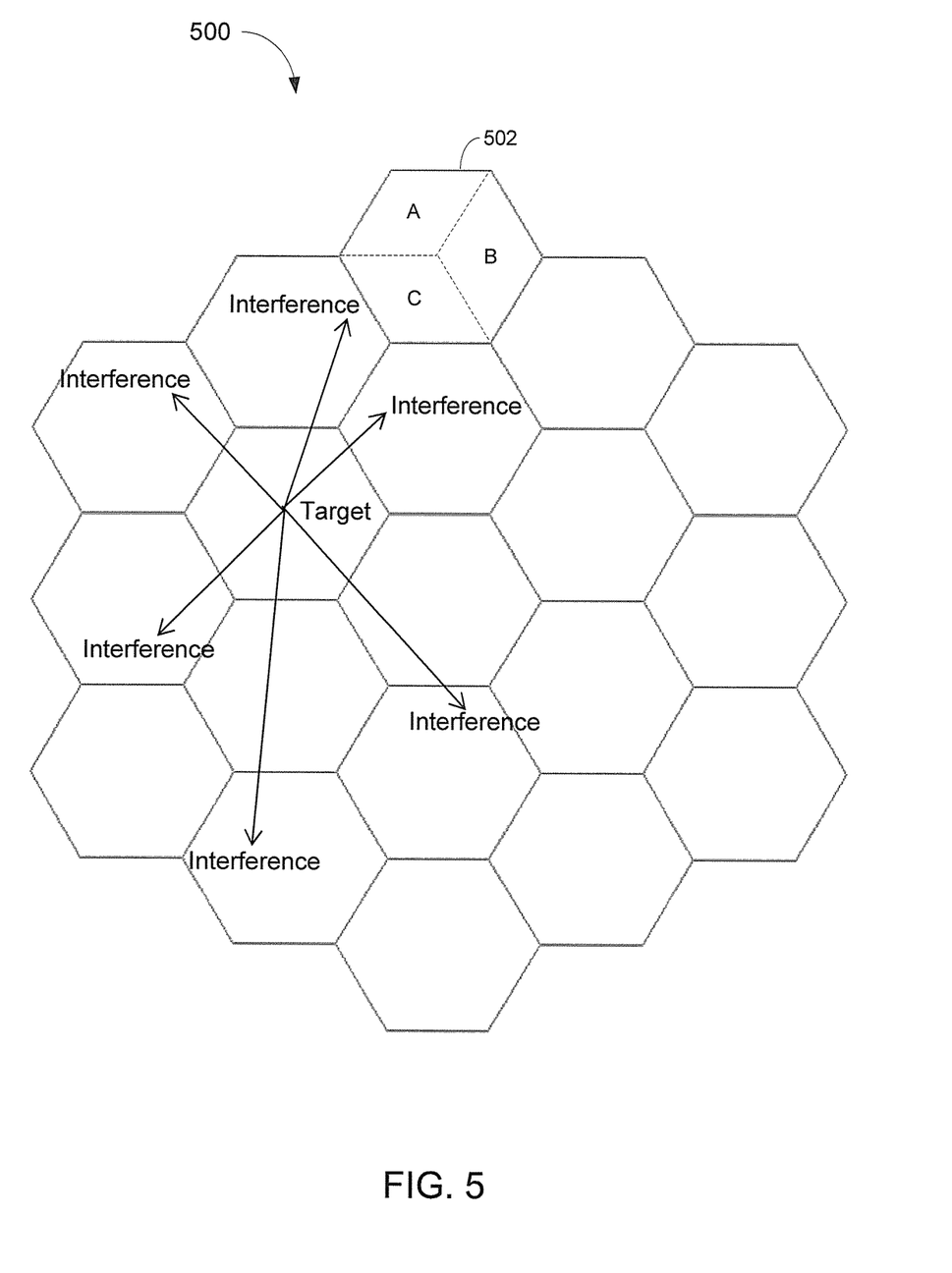
FIG. 5 illustrates an example method for determining the values for an interference mutual information (MI) table according to this disclosure.

FIG. 5 illustrates an example technique for determining the values for the interference table 402 according to this disclosure. The values for the interference table 402 can be developed in a simulation environment, and can be determined statistically by averaging empirically determined values across a number of drops (i.e., transmission beam vertical tilts corresponding to different users) and sectors. In general, the values of the interference table 402 are approximate values. Simulations show that performance gains are not very sensitive to small changes in values in the interference table 402. Thus, the approximate values in the interference table 402 provide good results and offer simplicity in their determination.

In FIG. 5, the simulation environment 500 comprises 19 cells, including representative cell 502. Each cell 502 includes 3 sectors: A, B, and C. Thus, there are a total of 57 sectors (19 cells×3 sectors/cell) in the simulation environment 500. Each of the 57 sectors can be a target sector or an interfered sector, depending on where a transmit beam is directed. In other simulation embodiments, the number of cells in the simulation environment 500 could be higher or lower (e.g., 7 cells or 37 cells) and the number of sectors/cell could be different (e.g., 6 sectors/cell). In the simulation environment 500, a transmit beam can be set at one of a plurality of drops (i.e., tilts).

For each combination of drop d, target sector s, interfered sector i, and RI/PMI pair (rank r, PMI p) a mutual information (MI) value $MI_{d,s,i,r,p}$ is determined. For example, one MI value may be determined for a transmit beam with drop d directed at the target sectors. The MI value may be determined for rank r and PMI p taking into account the interference effect of the transmit beam at interfered sector i. The determined MI value is represented as $MI_{d,s,i,r,p}$, where:

$$MI_{d,s,i,r,p}=f(d,s,i,r,p).$$

In some embodiments, the function f(d, s, i, r, p) may not represent a particular mathematical function, but rather a set of values empirically determined in the simulation environment 500.

Once the values $MI_{d,s,i,r,p}$ are determined for each d, s, i, r, and p, the values are averaged over all drops to obtain a statistical average value. That is:

$$MI_{s,i,r,p}=\text{AVG}(MI_{1,s,i,r,p},MI_{2,s,i,r,p},\ldots MI_{D,s,i,r,p}) \text{ for all } 1\leq d\leq D,$$

where D is the total number of drops.

The $MI_{s,i,r,p}$ values are then averaged over all 57 target sectors to obtain a statistical average value. That is:

$$MI_{i,r,p}=\text{AVG}(MI_{1,i,r,p},MI_{2,i,r,p},\ldots MI_{57,i,r,p}).$$

The $MI_{i,r,p}$ values are then summed to determine the interference effect to all other sectors not including the target sector, i.e., summed over the remaining 57−1=56 sectors of the overall network. That is:

$$MI_{r,p}=MI_{1,r,p}+MI_{2,r,p}+\ldots+MI_{56,r,p}.$$

The $MI_{r,p}$ values are then arranged in an interference MI table such as the interference table 402. The interference table has a size of (# of ranks, # of PMIs), where each value in the interference table is the interference effect of the pair (rank r, PMI p). The values in the interference table are "relative" values, because the choice of one pair versus another pair is a relative choice. Thus, the mean is taken out to reflect the interference differences between pairs. For example, if a value "m+a" corresponding to pair 1 is greater than another value "m+b" corresponding to pair 2, then "a" is greater than "b", and the choice is independent of the mean value "m".

In real (non-simulation) systems, the interference table can include approximate values, and to populate the interference table statistically, the values can be determined using methods similar to the simulation methods described above. This can require long-term averaging and information exchanges between base stations.

Figure 6:
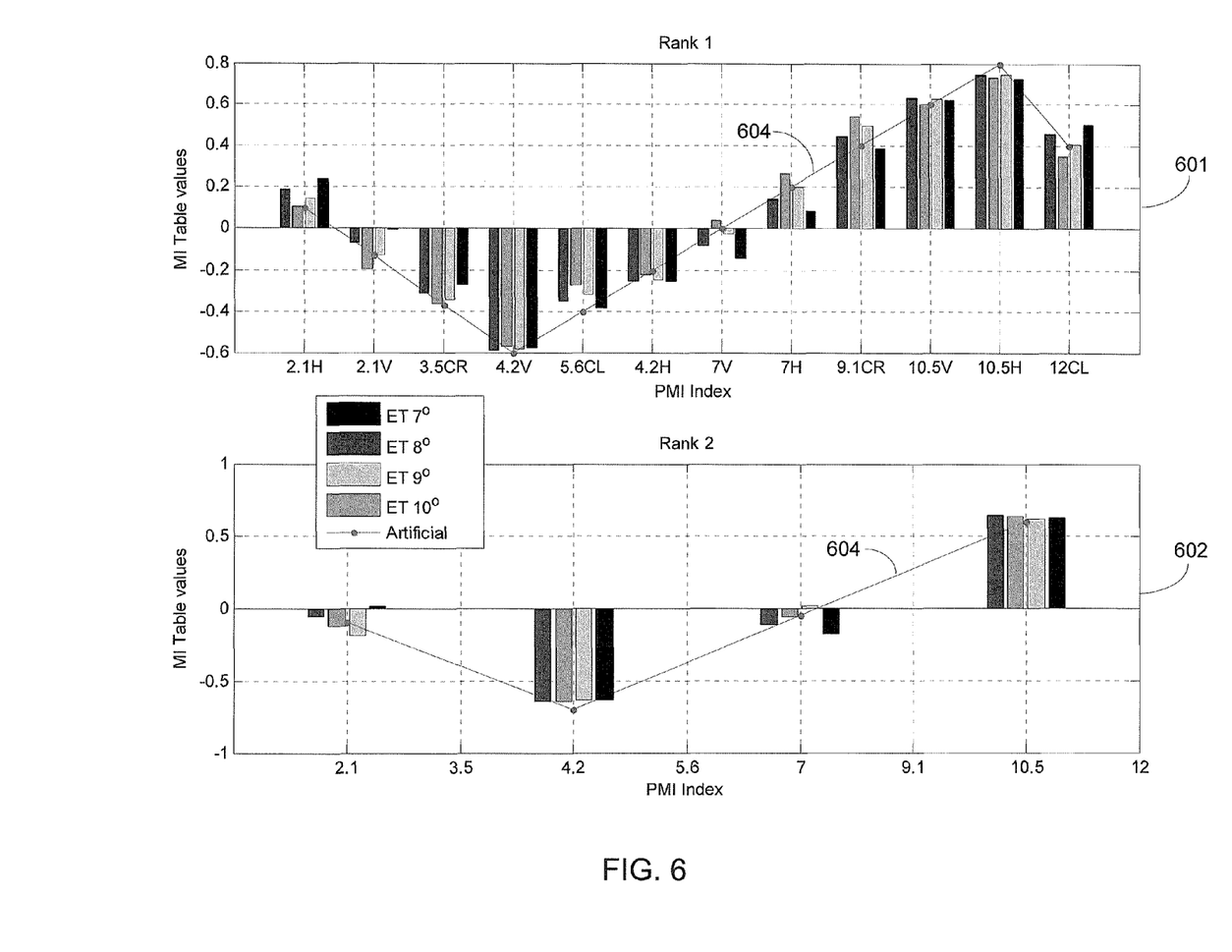
FIG. 6 illustrates example graphs depicting values for an interference MI table as determined in a simulation environment, according to this disclosure.

FIG. 6 illustrates example graphs depicting values for an interference MI table as determined in a simulation environment such as the simulation environment 500, according to this disclosure. The graph 601 shows values associated with Rank=1, and the graph 602 shows values associated with Rank=2. Each graph 601-602 has a plurality of PMI indices along the X-axis and interference MI table values determined in simulation along the Y-axis. For each PMI index, a plurality of bars represent the determined interference MI table value for a particular electrical tilt (ET) angle (e.g., 7°, 8°, 9°, 10°), as indicated by the graph key. A plot line 604 in each graph 601-602 represents a fitted curve determined by artificial scaling of the bar graph data in each graph 601-602. The values represented by the bars or the plot line 604 may be populated into an interference MI table, such as the interference table 402.

Figure 7:
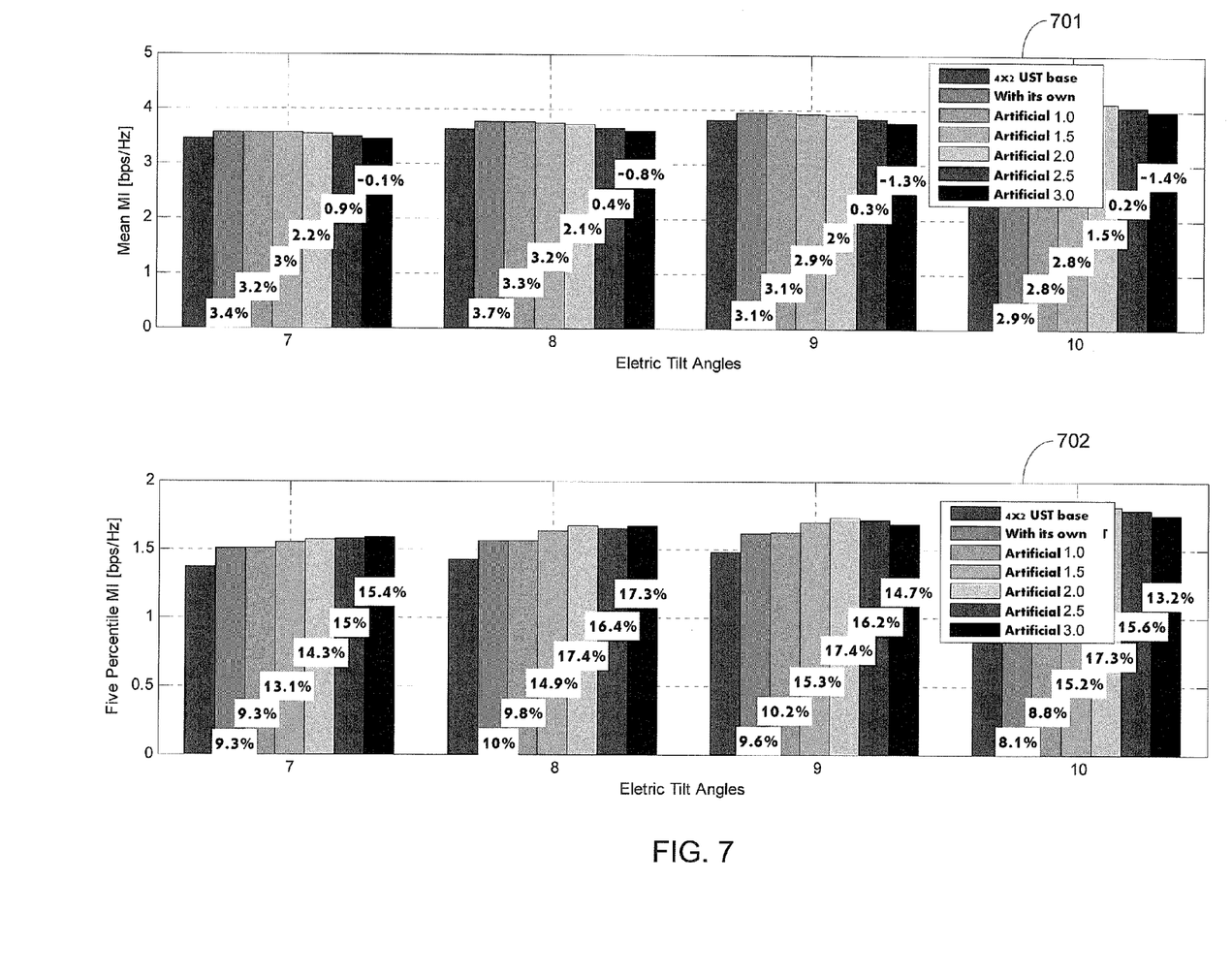
FIG. 7 illustrates example graphs depicting network throughput gains (average gains and edge user gains) achieved by using the MI table values depicted in FIG. 6.

FIG. 7 illustrates example graphs 701-702 depicting throughput values by using the collected interference MI table values in FIG. 6 and plot line 604 (artificial values) in FIG. 6 using different scaling values (1.0, 1.5, 2.0, 2.5, 3.0) to artificially scale the bar graph data in FIG. 6. The data in each graph 701-702 is based on a 10% reference signal, as known in the art. The graph 701 indicates the mean MI, while the graph 702 indicates the fifth percentile MI. The mean MI represents the average MI (throughput) of all the users. The fifth percentile MI, normally called "edge user performance", represents the cutting line MI (throughput) value of the lowest 5% of all the users. The larger the scaling value, the further the plot line 604 deviates from the bars of FIG. 6.

Figure 8:
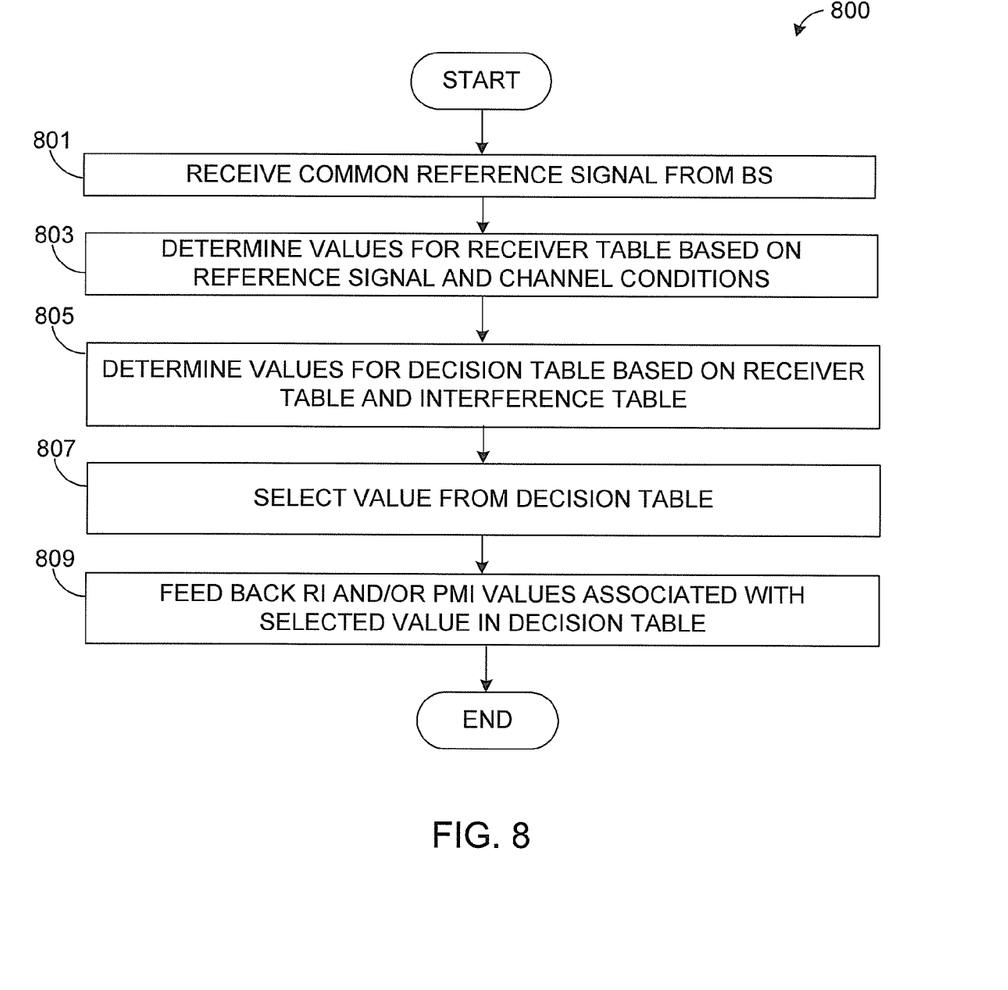
FIG. 8 illustrates an example method for channel feedback according to this disclosure.

FIG. 8 illustrates an example method for channel feedback, according to this disclosure. For ease of explanation, the method 800 is described as being used with the UE 310 of FIG. 3. However, the method 800 could be used by any suitable device and in any suitable system or network.

At operation 801, the UE receives a common reference signal transmitted from the BS. At operation 803, based on the common reference signal and one or more channel conditions, the UE determines the values in a receiver table (e.g., the receiver table 401). In some embodiments, the UE may determine the values in the receiver table using known techniques.

At operation 805, the UE takes the values in the receiver table and corresponding values in a predetermined interference mutual information (MI) table (e.g., the interference table 402), and determines the values for a decision table (e.g., the decision table 403) using the values in the receiver table and the interference table. In some embodiments, this may include arithmetically summing corresponding values in the receiver table and the interference table to obtain the values for the decision table. In some embodiments, the interference table is predetermined using long-term averaging of channel condition data exchanged between a plurality of base stations.

At operation 807, the UE selects a value from the decision table. In some embodiments, this may include the UE selecting the largest value in the decision table. Later, at operation 809, the UE feeds back RI and/or PMI values associated with the selected value in the decision table. The RI and PMI can be used at the BS to select a transmit beam for a data channel for the UE.

Although FIG. 8 illustrates one example of a method 800 for channel feedback, various changes may be made to FIG. 8. For example, while shown as a series of steps, various operations in FIG. 8 could overlap, occur in parallel, occur in a different order, or occur any number of times. Also, while these operations are disclosed at being performed by the UE, one or more of these operations could also or alternatively be performed at the BS or network controller.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for channel feedback at a user equipment (UE), the method comprising:
    determining, based on a common reference signal received from a base station and one or more channel conditions, a plurality of values for a receiver table;
    determining a plurality of values for a decision table based on corresponding values in the receiver table and a predetermined interference table, the predetermined interference table indicating interference caused at one or more other UEs that is approximated artificially and determined in advance;
    selecting a value from the decision table; and
    transmitting, to the base station, at least one of a rank indicator (RI) value and a precoding matrix indicator (PMI) value corresponding to the selected value in the decision table.

2. The method of claim 1, wherein determining the plurality of values for the decision table comprises arithmetically summing corresponding values in the receiver table and the interference table to obtain the values for the decision table.

3. The method of claim 1, wherein selecting the value in the decision table comprises selecting a largest value in the decision table.

4. The method of claim 1, wherein the interference table is predetermined using long-term averaging of channel condition data exchanged between a plurality of base stations.

5. The method of claim 1, wherein the transmitted at least one of the RI and PMI values enable the base station to select a transmit beam for a data channel for the UE.

6. The method of claim 1, further comprising receiving the common reference signal transmitted from the base station.

7. The method of claim 1, wherein the receiver table represents individual throughput of the UE, the predetermined interference table represents system interference, and the decision table is a combination of the receiver table and the interference table such that the value from the decision table is dependent on both individual throughput of the UE and on interference to the at least one other UE.

8. The method of claim 1, further comprising determining, based on empirically determined interference values for a plurality of transmission beam tilts and over a plurality of cells, a plurality of values for the predetermined interference table.

9. An apparatus for use in a user equipment (UE) and to provide channel feedback, the apparatus comprising:
    a non-transitory memory storage comprising instructions; and
    one or more processors in communication with the memory, wherein the one or more processors execute the instructions to:
        determine, based on a common reference signal received from a base station and one or more channel conditions, a plurality of values for a receiver table;
        determine a plurality of values for a decision table based on corresponding values in the receiver table and a predetermined interference table, the predetermined interference table indicating statistically determined interference caused at one or more other UEs by averaging the plurality of determined values across a number of drops;
        select a value from the decision table; and
        control the UE to transmit, to the base station, at least one of a rank indicator (RI) value and a precoding matrix indicator (PMI) value associated with the selected value in the decision table.

10. The apparatus of claim 9, wherein determining the plurality of values for the decision table comprises the one or more processors further executing the instructions to arithmetically sum corresponding values in the receiver table and the interference table to obtain the values for the decision table.

11. The apparatus of claim 9, wherein selecting the value in the decision table comprises the one or more processors further executing the instructions to select a largest value in the decision table.

12. The apparatus of claim 9, wherein the interference table is predetermined using long-term averaging of channel condition data exchanged between a plurality of base stations.

13. The apparatus of claim 9, wherein the transmitted at least one of the RI and PMI values enable the base station to select a transmit beam for a data channel for the UE.

14. The apparatus of claim 9, wherein the one or more processors further execute the instructions to receive the common reference signal transmitted from the base station.

15. A non-transitory computer readable medium storing computer instructions for use in a user equipment (UE), that when executed by one or more processors, cause the one or more processors to perform the steps of:
    determining, based on a common reference signal received from a base station and one or more channel conditions, a plurality of values for a receiver table;
    determining a plurality of values for a decision table based on corresponding values in the receiver table and a predetermined interference table;
    selecting at least one of a rank indicator (RI) value and a precoding matrix indicator (PMI) value from the decision table associated with the largest value and to minimize interference to the other UEs; and
    transmitting, to the base station, at least one of the RI value and the PMI value associated with the selected value in the decision table.

16. The non-transitory computer readable medium of claim 15, wherein determining the plurality of values for the decision table comprises causing the one or more processors to further perform the step of arithmetically summing corresponding values in the receiver table and the interference table to obtain the values for the decision table.

17. The non-transitory computer readable medium of claim 15, wherein selecting the value in the decision table comprises causing the one or more processors to further perform the step of selecting a largest value in the decision table.

18. The non-transitory computer readable medium of claim 15, wherein the interference table is predetermined using long-term averaging of channel condition data exchanged between a plurality of base stations.

19. The non-transitory computer readable medium of claim 15, wherein the transmitted at least one of the RI and PMI values enable the base station to select a transmit beam for a data channel for the UE.

20. The non-transitory computer readable medium of claim 15, further causing the one or more processors to further perform the step of receiving the common reference signal transmitted from the base station.

* * * * *